Patented Mar. 3, 1931

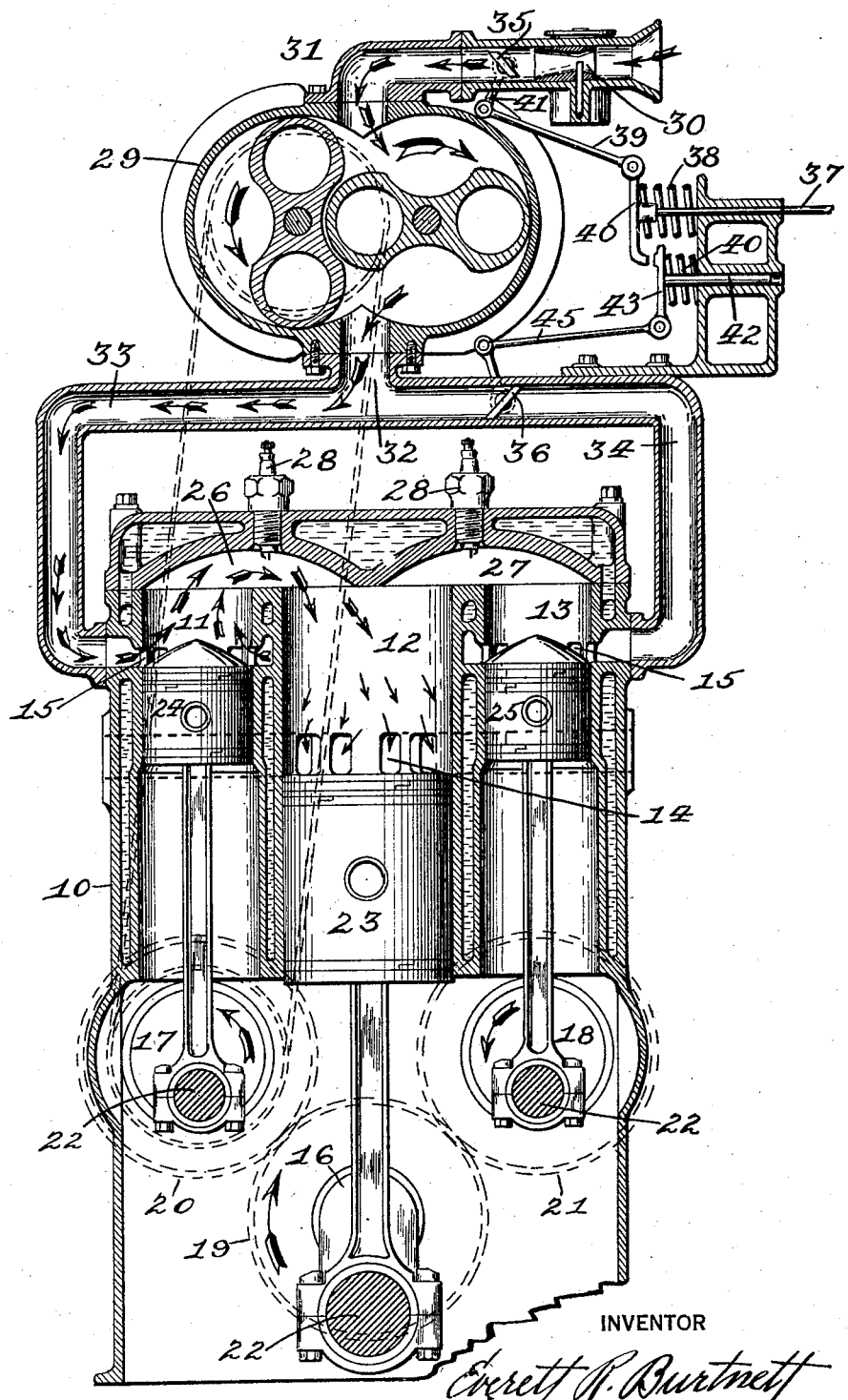

1,794,829

UNITED STATES PATENT OFFICE

EVERETT R. BURTNETT, OF SANTA ROSA, CALIFORNIA

INTERNAL-COMBUSTION ENGINE

Application filed June 21, 1929. Serial No. 372,664.

My invention relates to internal combustion engines and more particularly to fresh charge control means for combustion chambers having dual inlet valves, particularly combustion chambers of two stroke cycle engines made up of triple cylinders wherein two cylinders are provided with inlet ports and the other cylinder with exhaust ports.

It is well known that in the conventional two or four-cycle engines, the mixing of the burned gases remaining in the combustion chamber with the relatively small volume of fresh gaseous fuel mixture inducted into the chamber, when the engine is operated at light load, causes incomplete combustion, the engine to miss fire, to operate with irregularity, to vibrate and necessitates light load operation of the engine with too rich a mixture, which is uneconomical and generally a disadvantage to the working order of the engine.

The principal objects of my present invention are to provide an improved means of supply and control of the fresh charge to the combustion chamber. In the present invention this is accomplished by providing two supply pipes from a common supply pipe to the two inlet valves of the respective combustion chamber, by providing a main throttle valve in the main supply pipe and an auxiliary throttle valve in one of the two supply pipes, respectively leading to one of the two inlet valves, of a given combustion chamber, and to provide actuating means connecting the two throttle valves, so as to cause the auxiliary throttle valve, in the one of the two supply pipes to a given combustion chamber, to remain closed until the main throttle valve in the main supply pipe has been actuated to a point providing a predetermined opening, whereupon the connecting mechanism between the main and auxiliary throttle valves will effect the actuation of the auxiliary throttle pipe and provide a fresh charge thereafter to both inlet valves of a given combustion chamber.

Obviously, when the engine is operated at light load and the volume of fresh charge required to maintain the desired speed of the engine is comparatively very little, the localization during the compression event of the given volume of fresh charge will be considerably improved if the entire given volume of fresh charge is admitted to the combustion chamber at one relatively small and remotely located point of the chamber, instead of half measure, respectively at two relatively small and relatively remotely located points of the chamber, or instead of the charge volume being admitted to the chamber by means of one relatively large inlet port construction.

In any case a two stroke cycle internal combustion engine can only be operated with a compressor of some form. Recent developments have proven the advantage of operating a two stroke cycle internal combustion engine in combination with a positive rotary type compressor or supercharger. My present invention will prove most advantageous when employed with the aforesaid combination. With this fact in mind it is an object of my present invention to provide a fresh charge throttle controlled mechanism particularly adapted to two stroke cycle engines provided with rotary compressors.

Further objects and advantages of my present invention will be apparent from the following description, reference being had to the accompanying drawing, wherein a preferred form of embodiment of the present invention is clearly shown.

In the drawing a vertical section is shown of a triple cylinder two stroke cycle combustion chamber and associate operative units with a positive type rotary compressor. The supply passages and throttle control mechanism forming the embodiment of my present invention are shown relatively formed with the compressor and engine of a preferred arrangement.

For explanatory convenience a particular type of two stroke cycle internal combustion engine of my improved construction and most adaptable for use of my present invention is illustrated and the parts thereof described. It will be understood however, that the engine structure, the compressor or the combination of the compressor and two cycle engine do not constitute an embodiment of my present invention.

Referring by numerals to the accompanying drawings, which illustrate a practical embodiment of my invention, 10 designates an engine block, in which a combustion chamber unit comprising three cylinders 11, 12 and 13 are provided. Exhaust ports 14 are provided in one of the cylinders 12 which is arranged adjacent and between the other two cylinders. Inlet ports 15 are provided in each of the other two cylinders 11 and 13.

Three crank shafts 16, 17 and 18 are provided with the triple cylinder combustion unit and are operatively connected by driving gears 19, 20 and 21. One crank pin 22 is formed of each of the three crank shafts and the driving gears 19, 20 and 21 are relatively engaged so as to cause the three crank pins of the three crank shafts to be relatively rotated synchronously through the axes plane of the cylinders, from head to crank end centers.

A piston 23 and two valves 24 and 25 are provided with the triple cylinder combustion unit. The piston being arranged for reciprocatory movement within the central cylinder and one valve being arranged in each of the two outside cylinders.

To obtain the best results from the use of my improved fresh charge supply system for internal combustion engines the dual inlet port constructions of the combustion chamber should be relatively located at opposite ends of the common combustion chamber. In an engine of my improved construction as illustrated the two end cylinders 11 and 13 of a triple cylinder construction are provided with inlet ports 15 and the valves therein adapted to control the respective ports are operatively arranged to reciprocate synchronously, providing simultaneous control of the ports of both inlet cylinders to a given triple cylinder unit. Hence a fresh charge, if provided at the inlet ports of both cylinders, will be admitted to the chamber through two inlet constructions simultaneously, but if a fresh charge is only provided at the inlet ports of one of the two inlet cylinders, admission can only occur at the respective one of the two inlet cylinders.

The chambers of the three cylinders of the triple cylinder combustion chamber are commonly connected at their head ends by two compression and combustion clearance chambers 26 and 27, and an ignition device 28 is provided with each of the two clearance chambers.

A rotary type compressor device 29 is provided with the engine, preferably located above the engine. A fuel mixing device 30 (carburetor) is provided, preferably before the compressor 29 and connected with the inlet side of the compressor chamber by a main supply pipe 31, and a system of supply pipes comprising a dual induction manifold 32 having two branches 33 and 34 is provided connecting the chamber of the compressor, on the discharge side, with the inlet ports 15 of each two inlet cylinders of the triple cylinder combustion chamber.

A main throttle valve 35 is provided in the main supply pipe 31, between the carburetor and the compressor chamber, another throttle valve is provided, this latter valve being an auxiliary throttle valve 36, is arranged in one of the two branches 34 of the dual induction manifold 32.

A throttle valve control mechanism is provided preferably comprising a rod 37 adapted to be manually operated, which is provided with a spring 38, to cause the automatic return of the throttle opening rod to its resting position. A rod 39 is provided connecting the head piece 40 of the throttle operating rod 37 with a lever 41 of the main throttle valve 35. An automatic actuating mechanism comprising a rod 42, having a head piece 43 and a spring 44 is provided for engagement with the head piece 40 of the manual operating rod 37. A rod 45 is provided connecting the automatic actuating rod 42 and head piece 43 with the auxiliary throttle valve 36.

The spring 38 causes the main throttle valve 35 to be held in a closed position at all times when the operating rod 37 is not drawn. The spring 40 causes the auxiliary throttle valve 36 to be held in a closed position at all times when the head piece 40 of the operating rod 37 has not been drawn a sufficient amount to contact the head piece 43 of rod 42, causing the said rod 42 and rod 45 to be drawn. Obviously when the operator moves the throttle control of the engine only slightly, for light load operation, the main valve 35 subsequently will be opened slightly and the auxiliary valve 36, controlling the passage of fresh charge to one of the dual piston valves to the common triple cylinder combustion chamber, will remain closed. Hence at light load operation, with slight throttle opening, a fresh charge will be provided to one of the dual inlet valves only and since a given volume only is required to operate the engine at a given low speed when idling, or operating with a light load, the induction of the given volume into and scavenging only one of two correspondingly smaller compression clearance chambers of the common triple cylinder combustion unit, will provide a comparatively clean mixture, effectively localized in one of the two clearance chambers only during the compression event, of less residual gas dilution and consequently of improved condition for combustion, assuring regularity of firing, with uniformity of power impulses providing means of operating a two stroke cycle engine with comparatively improved flexibility over the conventional four-cycle engine and of greater combustion efficiency at light load operation.

The direction of flow of the fresh fuel charge, beginning with the air stream through the carburetor, the gaseous mixture beyond the carburetor through the compressor chambers, through the dual induction manifold 32 and one branch 33 of the dual induction manifold to the inlet ports 15 of only one of the two inlet valves of the triple cylinder combustion chamber, when the engine is operating at idling or light load operation, is designated by the large arrows, drawn in the respective passages in the drawing, while the exhaust of the residual gases through the exhaust ports is designated by the small arrows.

It is apparent that the present invention is not limited in its application to a two stroke cycle engine of the particular construction as illustrated since it is obvious that the invention may be applied to other types of dual inlet combustion units.

While the form of embodiment of the present invention as herein disclosed, constitutes a preferred form, it is to be understood that other forms might be adopted, all coming within the scope of the claims which follow.

I claim as my invention:

1. An engine comprising, in combination, a combustion chamber, a dual inlet valve construction of the combustion chamber, a main gaseous fuel supply duct having branch ducts provided with the engine, the said branch ducts being arranged as to respectively separately provide a passage communication between the said main supply duct and each of the inlet valves of the said dual inlet valve construction of a given combustion chamber unit, and means including a throttle valve arranged in the said main and a throttle valve arranged in one of the said branch gaseous fuel supply ducts, to one of the inlet valves only, of the duel inlet valve construction of a given combustion unit for effecting a main control of supply to all the inlet valves of a given combustion chamber and an auxiliary control of supply to one inlet valve only of the dual inlet valve construction of a given combustion unit.

2. An engine comprising, in combination, a combustion chamber having inlet ports provided at two points, a main gaseous fuel supply duct, two lateral ducts of the said main supply duct, one of the said two lateral ducts being arranged respectively connecting with the inlet ports at one point and the other of the said two lateral ducts being arranged respectively connecting with the inlet ports at the other point of the combustion chamber, means provided with the said main and one of the two lateral ducts including two throttle valves for effecting the flow of gaseous fuel separately through one of the said lateral ducts only to the inlet ports at one of the two points of the combustion chamber only while the engine is operated at light load and means including actuating gearing provided mechanically associating the two throttle valves for effecting the flow of gaseous fuel simultaneously through each of the said two lateral ducts to the inlet ports at each of the said two points of the combustion chamber when the engine is operated with a load approaching heavy duty.

3. An engine comprising, in combination, a combustion chamber having a duel system of inlet ports, a gaseous fuel compressor, a gaseous fuel supply pipe leading to the inlet side of the compressor, an induction manifold having two ducts to one combustion chamber connecting the discharge side of the compressor with the inlet ports of both units of the said dual inlet system of ports of the combustion chamber, a throttle valve system including a throttle valve operatively arranged in the gaseous fuel supply pipe before the compressor for controlling the inlet volume to the compressor and a second throttle valve operatively arranged in one of the two ducts of the induction manifold for controlling the passage of gaseous fuel to one unit of the dual inlet ports of the combustion chamber, throttle operating mechanism associating the throttle valve of the one duct of the induction manifold with the throttle valve of the gaseous fuel supply pipe and means of the said throttle operating gearing including engaging parts of each of the two throttle valves for effecting secondary opening actuation of the throttle valve located in the one of the two ducts of the said induction manifold.

4. An engine comprising, in combination, a combustion chamber having three cylinders, inlet ports formed in two of the cylinders, pistons operatively arranged within all the cylinders, the pistons of the cylinders having the inlet ports being adapted to open and close the respective ports simultaneously, a fresh charge compressor, a fresh charge supply pipe connecting with the inlet side of the compressor, a fresh charge discharge pipe connecting with the outlet side of the compressor, branch pipes of the said discharge pipe respectively connecting with the two cylinders having the inlet ports providing fresh charge passage communication between the compressor and the inlet ports of each of the two cylinders of the combustion chamber having inlet ports, two throttle valves, one of the said two valves being adapted to operate as a primary throttle valve, the other of the said two valves being adapted to operate as a secondary throttle valve, the primary throttle valve being arranged in the said supply pipe before the compressor, the secondary throttle valve being arranged in the branch pipe connecting with the inlet ports of one of the two cylinders of the combustion chamber having inlet ports, and means including a primary and secondary throttle valve actuating device associated with the said two throttle valves for effecting two phase opening operation relatively of the said two throttle valves, as to cause the primary throttle valve to be opened to a predetermined point before the opening of the secondary throttle valve is effected.

5. A two stroke cycle internal combustion engine operative unit comprising, in combination, a triple cylinder combustion chamber having three ported cylinders arranged adjacent and in line with their chambers commonly connected at their head ends, the ports of the two end cylinders of the in line three cylinder combustion chamber being adapted to function for the admission of fresh charge to the combustion chamber, a fresh charge compressor, a main gaseous fuel duct, a plurality of branch gaseous fuel ducts formed of the said main gaseous fuel duct provided with each of the two cylinders having inlet ports of a given combustion chamber, each branch fuel duct providing a separate fresh charge communication with the inlet ports respectively of each of the two inlet cylinders of a given combustion chamber, a throttle valve adapted to primary operation arranged in the said main gaseous fuel duct, a second throttle valve adapted to secondary operation arranged in the branch gaseous fuel duct to one of the inlet cylinders of a given combustion chamber and means operatively associating the two throttle valves as to effect the primary opening of the throttle valve arranged in the said main gaseous fuel duct relatively with the opening of the other throttle valve arranged in the said branch gaseous fuel duct.

6. An engine comprising, in combination, a combustion chamber having two series of inlet ports, members provided with each of the two series of inlet ports for effecting simultaneous opening and closing of the respective inlet ports of the two series of inlet ports of a given combustion chamber, a fresh charge manifold comprising a main duct and two branch ducts, one of the said branch ducts being arranged respectively providing a separate duct communication with each of the two constructions of inlet ports with a given combustion chamber, two throttle valves, one throttle valve being arranged in the said main duct, the other throttle valve being arranged in one of the said two branch ducts with a given combustion chamber, and means including an engaging device operatively associating the two throttle valves for effecting, in response to the primary actuation of the throttle valve arranged in the said main duct, such relatively movement between the two throttle valves as to cause the throttle valve arranged in the said branch duct to open last and close first with respect to the opening and closing time and movement of the throttle valve arranged in the said main gaseous fuel duct of the said manifold.

7. In an engine charging system, a combustion chamber, two inlet port constructions of the said combustion chamber, a charging manifold, a main duct of the said manifold, two branch ducts of the said manifold formed with each combustion chamber, one of the said two branch ducts being arranged separately communicating respectively with each of the said two inlet port constructions of the said combustion chamber, two throttle valves, one throttle valve operatively arranged in the said main duct, the other throttle valve operatively arranged in the branch duct to one only of the two constructions of inlet ports of the combustion chamber, and means operatively connecting the two throttle valves for primarily effecting the opening and secondarily effecting the closing of the throttle valve arranged in the said main duct relatively with the opening and closing of the throttle valve arranged in the said branch duct.

8. In a two stroke cycle internal combustion engine, the combination, a triple cylinder combustion chamber having inlet ports formed of two cylinders and means adapted to simultaneously open the inlet ports of the said two cylinders, an inlet manifold having a dual construction of ducts respectively providing a fresh charge passage communication with the inlet ports of each one of the two inlet cylinders of the triple cylinder combustion chamber, and means of said inlet manifold including two throttle valves for effecting a primary supply of fresh charge to the inlet ports of one of the two inlet cylinders of a triple cylinder combustion chamber only when the engine is operated of light load, and to the inlet ports of each of the two inlet cylinders of the triple cylinder combustion chamber only when the engine is operated with a heavy load.

9. In an internal combustion engine, the combination, with a combustion chamber having three cylinders commonly connected at their head ends, the three cylinders being arranged in line, ports formed intermediate the ends of all the cylinders, the ports of the central cylinder being adapted to exhaust function, the ports of the two end cylinders being adapted to inlet function, pistons arranged in all the cylinders, the pistons of the two end cylinders having the inlet ports being adapted to operate reciprocal synchronously to effect simultaneous opening of the inlet ports of the respective two cylinders, two fresh charge ducts, one of the said fresh charge ducts being arranged with each of the two end inlet port cylinders of the combustion chamber, a valve arranged in one of the said two ducts for effecting a shut off of the fresh charge supply to the inlet ports of one of the two inlet port cylinders of the combustion chamber while the engine is operated on a fresh charge conveyed to the combustion chamber through the other of the said two ducts.

In testimony whereof I affix my signature.

EVERETT R. BURTNETT.